United States Patent
Joosten

(10) Patent No.: US 10,359,024 B2
(45) Date of Patent: Jul. 23, 2019

(54) WIND TURBINE, ITS USE AND A VANE FOR USE IN THE TURBINE

(71) Applicant: Wilhelmus Helena Hendrikus Joosten, Arcen (NL)

(72) Inventor: Wilhelmus Helena Hendrikus Joosten, Arcen (NL)

( * ) Notice: Subject to any disclaimer, the term of this patent is extended or adjusted under 35 U.S.C. 154(b) by 0 days.

(21) Appl. No.: 16/070,452

(22) PCT Filed: Feb. 2, 2017

(86) PCT No.: PCT/EP2017/052219
§ 371 (c)(1),
(2) Date: Jul. 16, 2018

(87) PCT Pub. No.: WO2017/134145
PCT Pub. Date: Aug. 10, 2017

(65) Prior Publication Data
US 2019/0024632 A1    Jan. 24, 2019

(30) Foreign Application Priority Data
Feb. 3, 2016   (EP) .................................. 16153987

(51) Int. Cl.
*F03D 3/00* (2006.01)
*F03D 3/06* (2006.01)

(52) U.S. Cl.
CPC ............. *F03D 3/005* (2013.01); *F03D 3/061* (2013.01); *F03D 3/062* (2013.01);
(Continued)

(58) Field of Classification Search
CPC .......... F05B 2240/218; F05B 2240/231; F05B 2240/232; F05B 2240/302; Y02E 10/74; F03D 3/061; F03D 3/062; F03D 3/005
(Continued)

(56) References Cited

U.S. PATENT DOCUMENTS 5,570,997 A    11/1996 Pratt
2008/0019832 A1 *   1/2008 Anderson ............. B64C 27/023
                                                    416/117
(Continued)

FOREIGN PATENT DOCUMENTS

CN    101737252 A    6/2010
EP       0931933 A2    7/1999
(Continued)

*Primary Examiner* — Charles Reid, Jr.
(74) *Attorney, Agent, or Firm* — Richard M. Goldberg

(57) ABSTRACT

A wind turbine for converting wind into mechanical energy, includes a support and a vane rotatably connected to the support, the vane including an elongated body and a wind receptacle formed as a lid hinged to the body such that the receptacle can adopt an open configuration wherein the lid is hinged away from the body, and a closed configuration wherein the lid is hinged towards the body, the lid having an outer surface directed away from the wind when the receptacle takes the open configuration, and an opposite inner surface, wherein the inner surface of the lid is provided with profiles protruding from the inner surface, and extending in a direction perpendicular to the longitudinal direction of the vane, and wherein the profiles diverge toward the site where the lid is hinged to the body.

12 Claims, 3 Drawing Sheets

(52) U.S. Cl.
CPC ... *F05B 2240/218* (2013.01); *F05B 2240/231* (2013.01); *F05B 2240/232* (2013.01); *F05B 2240/302* (2013.01); *Y02E 10/74* (2013.01)

(58) Field of Classification Search
USPC .......................................................... 290/55
See application file for complete search history.

(56) References Cited

U.S. PATENT DOCUMENTS

| | | |
|---|---|---|
| 2008/0217925 A1 | 9/2008 | Boone et al. |
| 2011/0027079 A1* | 2/2011 | Corrado ................. F03D 3/067 416/1 |
| 2012/0045333 A1* | 2/2012 | Al-Azzawi ............. F03D 3/068 416/41 |
| 2012/0267895 A1 | 10/2012 | Blaxland et al. |
| 2014/0322014 A1* | 10/2014 | Hetherington ............ F03D 3/02 416/132 B |

FOREIGN PATENT DOCUMENTS

| | | | |
|---|---|---|---|
| WO | 2009153772 A1 | 12/2009 | |
| WO | 2012041961 A1 | 4/2012 | |
| WO | 2014006075 A1 | 1/2014 | |
| WO | WO-2014006075 A2 * | 1/2014 | ............. F03D 3/005 |

* cited by examiner

WIND TURBINE, ITS USE AND A VANE FOR USE IN THE TURBINE

FIELD OF THE INVENTION

The present invention pertains to a wind turbine for converting wind into mechanical energy, comprising a support and a vane rotatively connected to said support, the vane comprising an elongated body and a wind receptacle which in essence is formed as a lid which is able to hinge with respect to the body such that the receptacle can adopt an open configuration wherein the lid is hinged away from the body, and a closed configuration wherein the lid is hinged towards the body, the lid having an outer surface which is the surface that is directed away from the wind when the receptacle takes the open configuration, and an opposite inner surface, in particular the invention pertains to a wind turbine wherein the inner surface of the lid is provided with one or more profiles protruding from the inner surface, and extending in a direction perpendicular to the longitudinal direction of the vane. The invention also pertains to the use of the wind turbine for converting wind into work, and to a vane for use in the wind turbine.

BACKGROUND OF THE INVENTION

Wind turbines are commonly used since centuries to convert wind into work. A wind turbine typically is an impulse turbine. The turbine changes the direction of flow of the wind and the resulting impulse spins the turbine and leaves the wind with diminished kinetic energy. If the mechanical energy is used to produce electricity, the device may be called a wind generator or wind charger. If the mechanical energy is used to drive machinery, such as for grinding grain or pumping water, the device is usually called a windmill or wind pump. Developed for over a millennium, today's wind turbines are manufactured in a range of vertical and horizontal axle types. The most common and oldest ones are the horizontal axle turbines, wherein the axles are positioned in line with the direction of the wind (i.e. the direction in which the wind blows). The smallest turbines are used for applications such as battery charging or auxiliary power on sailing boats, while large grid-connected arrays of turbines are becoming an increasingly large source of commercial electric power.

One of the developments of the last decades is to devise wind turbines that are suitable for low wind velocities (typically below 10 m/s, about 5 Beaufort). In particular at lower heights, above land and in the presence of buildings, wind velocity is often too low to economically extract energy from common wind turbines. Recent developments include the Darrieus (including giromill and cycloturbine) and Savonius wind turbines which may generate mechanical energy even at a wind velocity below 5 m/s (about 3 Beaufort). Unlike the Savonius wind turbine, the Darrieus is a lift-type turbine. Rather than collecting the wind in cups dragging the turbine around, a Darrieus uses lift forces generated by the wind hitting aerofoils to create rotation. With these turbines, the axles are positioned transverse to the wind (as opposed to "in line" with the wind) which has the additional advantage that the vanes do not need to be pointed to the wind. In most cases the axles are positioned vertically (which explains the commonly used acronym VAWT: vertical axle wind turbine), but they may also be positioned horizontally as long as the axle is transverse to the wind (TAWT—transverse axle wind turbine—would thus be a more correct acronym), typically substantially perpendicular to the direction in which the wind blows. These wind turbines however have several disadvantages. Firstly, the overall rate of conversion of kinetic into mechanical energy of these turbines might be improved. Secondly, in particular Darrieus wind turbines are not self-starting. Therefore a small powered motor is required to start off the rotation, and then when it has enough speed the wind passing across the aerofoils starts to generate torque and the rotor is driven around by the wind. An alternative constitution is the use of one or two small Savonius rotors that are mounted on the shaft of the Darrieus turbine to start rotation. These Savonius rotors however slow down the Darrieus turbine when it gets going.

From WO2009/153772 (Kirpitznikoff, filed 2008) a wind turbine as described in the preamble (Field of the invention section, here above) is known.

From WO2014/006075 a wind turbine as described in the preamble is known, apart from the one or more profiles on the inner surface of the lid. The vanes of this turbine are provided with multiple separate wind receptacles and means operable to force the receptacles to adopt either an open or a closed configuration independent from the direction of the wind. Advantages of this known wind turbine are that the energy conversion is considerable higher than with more conventional wind turbines, in particular at low wind speeds. Also, due to the fact that the receptacles may be forced to actively take a configuration against the forces of gravity and/or wind, makes that the turbine requires only a very low wind velocity to start turning around. Next to this, by being independent from the direction of the wind for adopting either of the two configurations, the turbine allows to achieve a very high maximum conversion of wind force into motion.

From CN 101737252A also a wind turbine according to the preamble is known. This wind turbine is used to start a Darrieus type of turbine. A disadvantage however is that like other VAWT's, the overall rate of energy conversion is relatively low.

U.S. Pat. No. 5,570,997 discloses a wind turbine having a vane provided with a wind receptacle that opens when the vane is traveling in the direction of the wind and closes when the vane is traveling against the direction of the wind. This way, maximum capacity of the wind receptacle is used when the wind force has to be converted into motion of the vane, while the receptacle hardly counteracts this conversion when the vane travels against the direction of the wind. The receptacle opens by action of the wind blowing over the vane and closes under gravity when this wind action decreases.

OBJECT OF THE INVENTION

It is an object of the invention to devise a wind turbine that may have an improved energy conversion when compared to existing wind turbines.

SUMMARY OF THE INVENTION

In order to meet the object of the invention, a wind turbine according to the preamble has been devised in which turbine the inner surface of the lid is provided with one or more profiles protruding from the inner surface, and extending (exclusively) in a direction perpendicular to the longitudinal direction of the vane, wherein the turbine is further improved by the one or more profiles diverging (in height and/or width) toward the site where the lid is hinged to the body.

When using this kind of turbine the wind can freely flow over the inner surface of the lid along the one or more profiles without being hindered in the direction perpendicular to the longitudinal direction of the vane, but the wind is hindered in its free flowing over the inner surface of the lid in the direction parallel to the longitudinal direction of the vane. Applicant found that by providing the inner surface of the lid with such profiles, i.e. by having profiles that extend across the surface of the lid, and that extend in a direction perpendicular to the longitudinal direction of the vane (in other words, none of the profiles present across the inner surface of the vane extend in the longitudinal direction of the vane), the energy conversion of the turbine as known in particular from WO2014/006075 can be improved with about 10-25% or above. The reason for this is not 100% clear but without being bound to theory it is expected that a profile according to the invention has a dual positive effect. At first it is believed that it may serve to help in hinging the lid away from the body of the vane when the vane is approaching the position in which it is traveling fully in the direction of the wind, i.e. the position when extending perpendicular to the direction of the wind. By having the wind blowing laterally against the profile when the vane is still extending for the bigger part in the direction of the wind, this may help in forcing the lid to hinge away from the body of the vane. This way, the positive addition to the energy conversion by having the lid in the hinged away position (the receptacle then being in the open, wind catching position), is arrived at earlier in time. This is positive for the overall energy conversion. Secondly, it is believed that by hindering the wind in its free flow over the width of the lid (i.e. the dimension of the lid extending in the longitudinal direction of the vane), there is an increased drag and/or lift that provides for an additional energy conversion. This might be an effect comparable with the effect that wind diffusers on top of or against the bottom of sports cars have. With the diverging form of the one or more profiles, it is expected that the effect on the opening of the lid by the wind blowing laterally against the profile is further increased. Also, a diverging profile means that the wind is slightly hindered by travelling over the inner surface of the lid which might lead to an increased drag and/or lift which further increase the efficacy of the turbine.

It is noted that from EP0931933 a wind turbine using lids with profiles is known. However, this known wind turbine is of the drag type which means that the profiles in each and every situation are directed to extend in the direction of the wind. This principle cannot be adopted with a rotating wind mill. It is also noted that WO2012/041961 shows a wind turbine having hinged lids attached to a vane, the lids having on their lateral edges upright walls to create a true bucket shaped wind receptacle. This is opposed to the profiles across the inner surface as is the case with the present invention. Lateral walls on the edges cause great turbulence around the edges and will counteract the automatic opening of the lid by the wind. US 2008217925, like WO2012/041961, also shows true bucket shaped wind receptacles. The bucket causes so much turbulence that energy conversion is negatively influenced. To avoid this, and to actually provide a positive effect on energy conversion it is important that the profiles extend from the inner surface, that is, run across this surface, instead of laterally closing it by forming walls on the edges.

The advantage of the present invention is that the energy conversion might be significantly improved, even at low wind speeds, by using mere profiles. Such profiles have the advantage that they are passive devices, like a turbulator or roughness element, that are steady and require no energy by definition. Active control elements, such as valves, require actuators and thus energy.

The present invention also pertains to the use of a wind turbine as defined here-above for converting wind into work. As known from WO2014/006075, the presently improved turbine might be advantageously combined with a Darrieus wind mill. The present invention also pertains to a vane provided with a receptacle as defined here-above.

It is noted that a wind turbine according to the present invention can be operatively connected to a ground plane, typically having a support (such as a rotating or stationary axle) extending in a vertical direction, but may also be placed with its support extending in a horizontal direction (as long as the axis of rotation of the vane extends transverse to the wind) for example by mounting the support against a vertically extending wall. Also, the turbine can for example be placed on a floating raft or be placed on a pole that extends above water level.

Definitions

A surface that is directed away from the wind is a surface that faces the direction to which the wind blows, as opposed to a surface that is directed towards the winds which is a surface that is faced to the direction out of which the wind blows.

An element extending in a direction means that the element in essence runs parallel to the said direction, diverting at most under an angle of 30° to that direction over its entire length, preferably diverting less than 29, 28, 27, 26, 25, 24, 23, 22, 21, 20, 19, 18, 17, 16, 15, 14, 13, 12, 11 or even less than 10° to the said direction.

A profile that protrudes from a surface in the sense of the present invention has a macroscopic height of at least 2 millimeters.

A vane is a usually relatively thin, rigid and flat element that when mounted along an axis is turned by a gas or fluid flowing across the vane. Typical examples are a blade in a turbine or a sail on a windmill.

The configuration of an object is the form determined of the arrangement of the parts of the object in relation to each other and in space.

The direction of the wind is the main direction in which the wind blows.

A wind receptacle is an element that may extend in a direction perpendicular to the direction of the wind in order to convert the force of the wind into a motion in the direction of the wind.

A vane that travels in essence in the direction of the wind means that the vane is positively converting the force of the wind into motion (forward travel).

A vane that travels in essence against the direction of the wind means that energy is needed to force the vane to travel back through the wind (backwards travel)

EMBODIMENTS OF THE INVENTION

In a first embodiment of the wind turbine according to the invention, the one or more profiles are cone-shaped, diverging towards the site where the lid is hinged to the body.

In another embodiment of the wind turbine according to the invention the one or more profiles have a maximum height relative to the inner surface of the lid that is equal to at least 1% of the length of the lid in the longitudinal direction of the vane. It appears that at least the maximum height should meet a minimum value in order to arrive at an improvement in energy conversion that outweighs the additional costs of producing the turbine by adding the profiles (s). The maximum height is typically not the height that is adapted over the full length of the profile. Near the tip (upstream end) of the lid, i.e. the site furthest away from the site at which the lid hinges to the body of the vane, the height might even be close to or equal to zero to make sure the lid can hinge fully towards the body of the vane. Typically, near the site at which the lid hinges to the body of the vane, the height of the profile may be at maximum without interfering with the closure of the lid. In embodiments, the height relative to the inner surface of the lid that is equal to at least 2, 3, 4, 5, 6, 7, 8 or even 9% of the length of the lid in the longitudinal direction of the vane. In another embodiment the one or more profiles have a maximum height relative to the inner surface of the lid that is equal to at least 10% of the length of the lid in the longitudinal direction of the vane.

In yet another embodiment of the wind turbine according to the invention, the vane is an aerofoil shaped body, the lid being hinged to the body at a position adjacent a downstream end of the said body.

In again another embodiment the vane comprises multiple receptacles. It was recognised that when using multiple receptacles, the freedom to operate the turbine to increase the energy conversion can be further improved. More importantly however, it was recognised that having multiple receptacles allows the use of vanes of a significant longer length than when using one (large) receptacle that extends over a corresponding length of the vane. At high rotational speeds namely, the forces generated on the vane near the tip of the vane are significantly larger than the forces generated on the vane near the support. By having multiple independent receptacles, one can for example allow "outer" receptacles to take a configuration that has a lower capacity to convert wind force into motion, in order to reduce the mechanical impact on the vane. This on its turn allows using larger vanes, without necessarily needing very robust mechanical constructions. In a further embodiment the vane comprises a first receptacle at a top site of the vane and a second receptacle at a bottom side of the vane. In this embodiment near optimal use can be made of the receptacles and their capacity to convert wind energy into motion.

In an alternative embodiment the vane comprises multiple separate receptacles positioned along the length of the vane. It was recognised that the hydrodynamics (the flow of the air) along the length of the vane changes considerably when traveling from a position near the support (adjacent the heart of the turbine) to the tip of the vane. By using separate receptacles along the length of the vane, receptacles may have different configurations along the length of the vane accommodated to the differences in hydrodynamics. In a further embodiment a receptacle positioned near the support has a larger cross-section than a receptacle positioned further away from the support. This way, change in absolute traveling speed of the different portions along the length of the vane can be accommodated to. Typically adjacent the tip, the speed is so high that a small cross section of the receptacle may be needed to prevent that the construction needs to be very heavy to maintain rigidity of the vane. This concept can be applied for a turbine that has a different or even no means to force a receptacle to adopt at least one of the said configurations independent from the direction of the wind. In particular, even when the receptacles open and close merely under forces of wind and gravity, the feature of having multiple receptacles that have a decreasing maximum capacity to convert wind force into motion along the length of the vane can be advantageously used in a wind turbine to allow larger vane lengths. In a further embodiment each of the multiple separate receptacles comprises one or more profiles as defined herein above.

Also, the invention is embodied in a wind turbine that is provided with a means operable to force the receptacle to adopt the closed configuration when the vane travels against the direction of the wind. Using the present invention, no means need to be present to force the receptacle to take the open configuration when the vane travels in the direction of the wind. Due to the presence of the profile(s) the energy conversion rate is significantly improved anyway, possible by the easier and earlier opening of the receptacle. Still, it is advantageous to have a forced closure of the receptacle to minimize energy conversion loss. The means that are operable to force the receptacle to adopt the configuration, can have various embodiments as will be appreciated by any person having skill in the art of mechanics. The means could be constituted using mere mechanical parts such as levers, bars and sprockets, camshafts, rails and followers, optionally using hydraulics, or could be constituted using electro-mechanical parts such as (electro-)magnets, inducers, coils etc. Various other constitutions somewhere in the spectrum (or even outside) between pure mechanical and pure electrical are of course usable.

Lastly, the invention is embodied in a wind turbine that is provided with a means operable to force the receptacle to adopt the closed configuration when the vane travels in the direction of the wind. In this embodiment the vane can for example be closed when the wind blows at a too high speed, in order to prevent that the turbine will rotate too fast.

BRIEF DESCRIPTION OF THE DRAWINGS

The invention will now be further explained using the following figures and examples.

DETAILED DESCRIPTION

Example 1 provides data regarding energy conversion using a wind turbine according to the invention

FIG. 1

Figure 1:
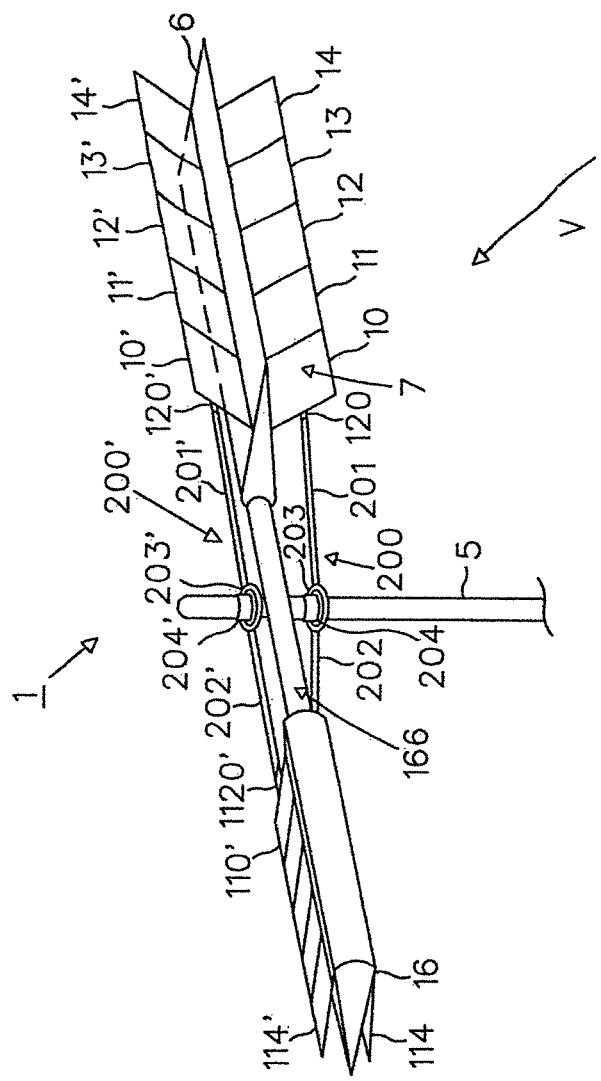
FIG. 1 shows a wind turbine as known from the art.

FIG. 1 shows a wind turbine as known from WO2014/006075. The turbine comprises two vanes 6 and 16 that are part of a rotor 166. FIG. 1 depicts means (200, 200') operable to force the receptacles 7 (comprising lids 10-14, 10'-14', 110-114 and 110'-114' respectively) to adopt a closed configuration, even when the vane is travelling against the direction of the wind V (as is shown for the left hand vane 16). In this figure a wind turbine 1 is depicted comprising two vanes 6 and 16 which are substantially of the same constitution as the vane 6 depicted in FIG. 2 of WO2014/006075. Each vane comprises 10 receptacles (vane 6: receptacles 7 formed by lids 10-14 and the corresponding bottom parts of the vane, as well as the receptacles formed by lids 10'-14' and the corresponding parts of the top side of the vane 6; vane 16: receptacles formed by lids 110-114 and the corresponding bottom parts of the vane, as well as the receptacles formed by lids 110'-114' and the corresponding parts of the top side of the vane 16). The turbine 1 is comprised of a first means 200 operable such that the receptacles comprising lids 110-114 adopt the closed configuration in essence by operation of said means. These means 200 comprise a first lever 201, which is pushed downwards by a pushing force of sub-lid 120 that has moved downwards due to gravity and wind forcing lid 10 down. The downward force on lever 201 is used to push lever 202 upwards. This way, lid 110 (behind vane 16; as such not shown), by virtue of lever 202 acting on its corresponding sub-lid 1120 (not shown), is pushed upwards such that the receptacle comprising lid 110 takes the (virtually) closed configuration. In order to correctly convert the movement from lever 201 to lever 202, means 200 comprise a converter 204. Means 200 may rotate around support 5 using bearing 203 to move in conjunction with the vanes. Converter 204 acts upon the levers to make sure the receptacles adopt the open configuration when a vane moves in the direction of the wind V (cf. vane 6 in FIG. 1), and the closed configuration when the vane moves against the wind V (cf vane 16 in FIG. 1). For this, the converter is aligned to the direction of the wind electronically (electronics not shown). In an alternative embodiment, the converter is aligned to the wind using a commonly known vane that is automatically aligned to the wind, which vane on its turn is operatively connected to the converter.

The same way as described here-above in conjunction with means 200, corresponding means 200', comprising levers 201' and 202', as well as converter 204' and bearing 203', are provided to force the receptacles on top of the vanes, comprising lids 10'-14' and lids 110'-114' (wherein lids 10' and 110' are provided with sub-lids 120' and 1120' respectively), to adopt the open configuration when the vane travels in the direction of the wind. Correspondingly, the energy that is released when lids 110' through 114' close upon acting of gravity and the wind, is transferred via converter 204' to have lever 201' actuated to force lids 10'-14' to move upwards such that the corresponding receptacles take the first configuration.

FIG. 2

Figure 2:
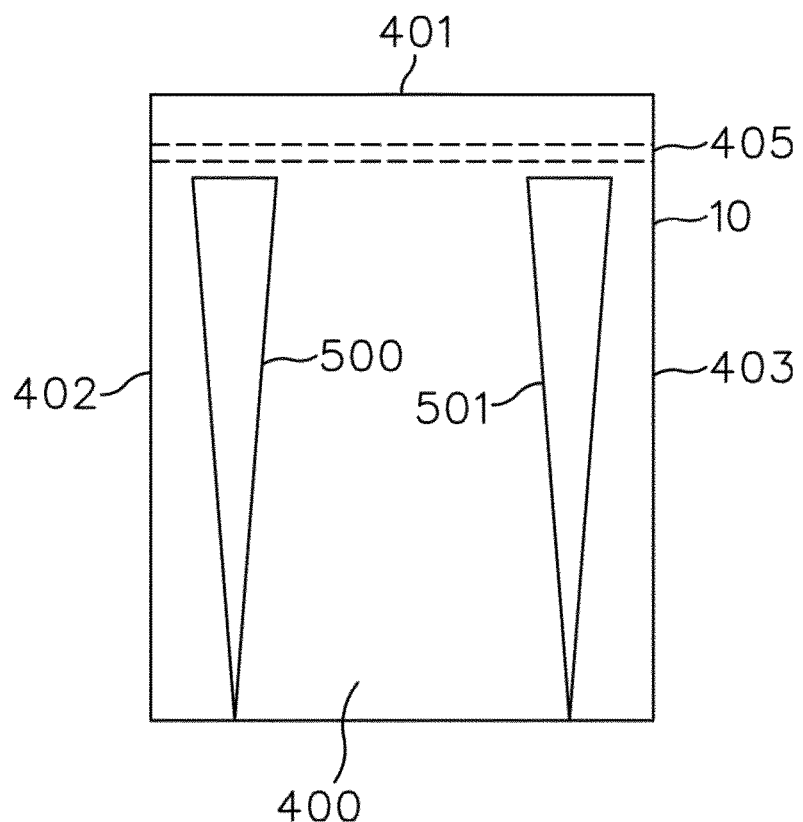
FIG. 2 schematically shows a lid with profiles according to the present invention.

FIG. 2 schematically shows a lid 10 with profiles 500 and 501 according to the present invention. The lid 10 has a downstream edge 401 adjacent the site 405 at which the lid is hinged to the body of a vane (not shown). The lid has lateral edges 402 and 403. The inner surface of the lid is indicated with numeral 400. From this surface two diverging profiles 500 and 501 protrude. These profiles extend solely in a direction perpendicular to the longitudinal direction of the vane, i.e. the direction parallel to downstream edge 401 of the lid 10, as well as protruding from the surface of the lid. The profiles in this case are cone shaped, having a rounded upper surface. In another embodiment (not shown) the cones are triangular shaped having two angled flat side surfaces.

FIG. 3

Figure 3:
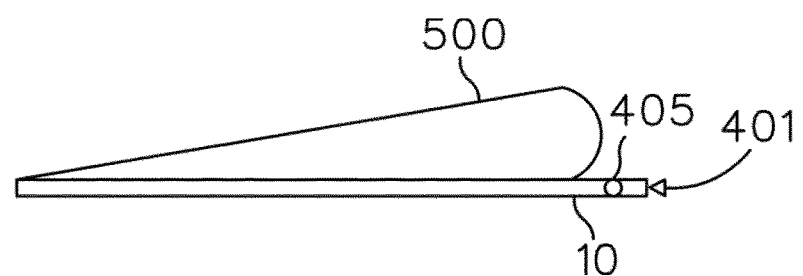
FIG. 3 is a side view of the lid of FIG. 2.

FIG. 3 is a side view of the lid 10 of FIG. 2. In this view it can be seen that the coned profile has its maximum height adjacent the downstream edge 401 of the lid. The height in this case is 16% of the width of the lid (as measured along edge 401). At the upstream end of the lid the height of the profile is zero as shown in FIG. 3.

FIG. 4

Figure 4:
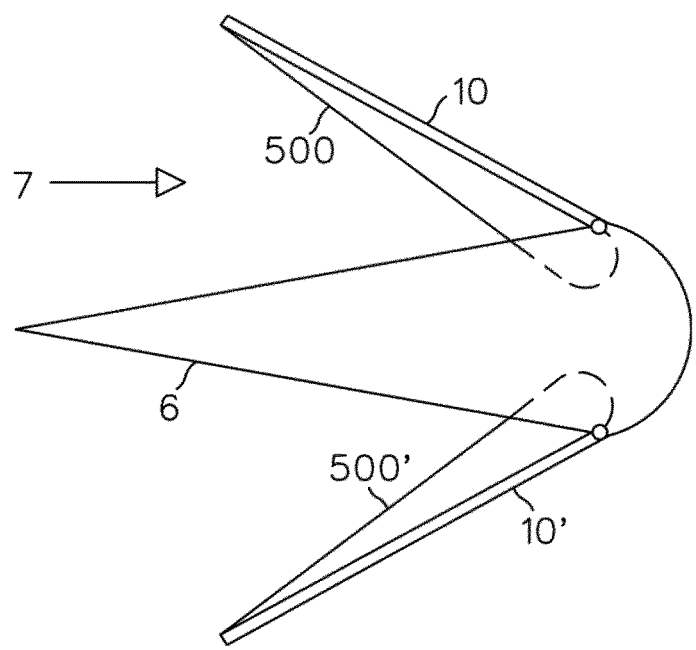
FIG. 4 schematically shows an aerofoil vane incorporating two lids according to the invention.

FIG. 4 schematically shows an aerofoil vane incorporating two lids according to the invention. The vane 6 has an aerofoil shape as known from WO2014/006075. The lids 10 and 10' are hinged at the front (downstream tip) of the body of the vane. The lids are shown in a configuration wherein they are hinged away from the body of the vane, thus forming a receptacle 7 in its open configuration.

FIG. 5

Figure 5:
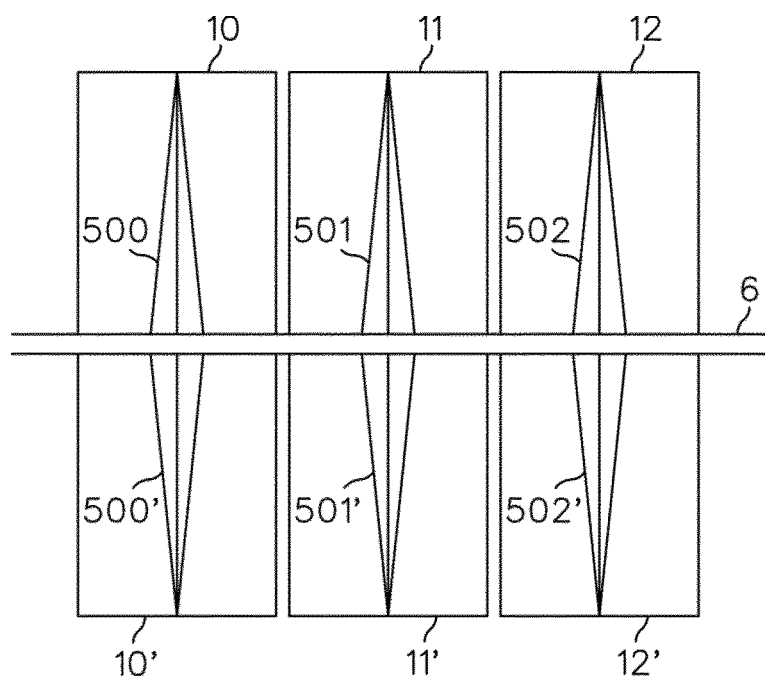
FIG. 5 shows a configuration of multiple separate lids on a vane.

FIG. 5 shows a configuration of multiple separate lids that form one vane. The lids 10 to 12 and 10' to 12' are arranged in the same way as indicated in FIG. 1. They are configured in two rows of consecutive lids, one at the top of the vane 6, the other at the bottom. Each lid is provided with one profile 500 (501, 502, 500', 501', 502') which corresponds in shape to the profile of FIGS. 2 and 3, having a tri-angular shaped cross-section. With such a constitution, depending on the wind speed, an improved energy conversion of up to 25% or above can be obtained with respect to the wind turbine as known from WO2014/006075.

Example 1

Example 1 provides data regarding energy conversion using models of a wind turbine according to the invention. In this example three different models of a turbine are used. Each model comprises a support and connected thereto a vane having an aerofoil body with a length of 920 cm. To the body a row of 5 separate contiguous upper lids, and 5 separate contiguous lower lids are connected, the lid having lengths of about 20 cm. This configuration corresponds to the configuration of a vane as shown in FIG. 4.

The first model (Model "0") has no profiles protruding from the inner surfaces of the ten hinged lids. The second model (model "1") has six profiles, evenly distributed over the inner surfaces of the lids (three at the upper row and three at corresponding positions at the lower row). The profiles are triangular in cross-section, are non-diverging (they have an even cross section throughout their entire length) and have an even height of about 3 cm. The profiles extend from the upstream end of the lids to the downstream end adjacent the site where the lids hinge with respect to the body, and run exactly in a direction perpendicular to the longitudinal direction of the vane. The third model (model "2") has ten profiles of the same configuration as the ones of model "1" and are also evenly distributed over the inner surfaces of the 10 lids (each lid having one profile).

In the comparative experiment, the model is statically positioned and wind at various speeds of 3, 4, 5, 6 and 7 m/s is blown against the vane with the lid in open position. At each wind speed, the torque that the vane provides (in Nm) is measured at the support. The torque is average for the 5 different wind speeds. This number corresponds to the energy conversion capacity of the vane in when applied in an actual turbine. This average torque is measured for each model with the vane being positioned at different angles with respect to the wind. An angle of 0° means that the vane is exactly parallel to the wind, an angle of 90° means that the vane is perpendicular to the direction of the wind). The results are given here below in table 1.

TABLE 1

Average torque for vanes at different angles with respect to the wind

| Angle [°] | Torque, Model 0 [Nm] | Torque, Model 1 [Nm] | Torque, Model 2 [Nm] |
| --- | --- | --- | --- |
| 30 | 5.4 | 5.9 | 6.0 |
| 60 | 8.6 | 9.3 | 9.3 |
| 90 | 7.3 | 8.3 | 8.6 |
| 120 | 4.3 | 5.1 | 5.3 |
| averaged | 6.4 | 7.1 | 7.3 |

It appears that with the profiles across the inner surfaces of the lids on average a 14% increase in torque could be obtained. The highest increase (23%) could be obtained with the lid having 10 profiles, when the angle with the wind was 120°.

What is claimed is:

1. Wind turbine for converting wind into mechanical energy, comprising:
    a support and
    a vane rotatably connected to said support, the vane comprising an elongated body and a wind receptacle which is formed as a lid adapted to hinge with respect to the body such that the receptacle can adopt an open configuration wherein the lid is hinged away from the body, and a closed configuration wherein the lid is hinged towards the body, the lid having an outer surface which is directed away from the wind when the receptacle takes the open configuration, and an opposite inner surface, wherein the inner surface of the lid is provided with at least one profile protruding from the inner surface, and extending in a direction perpendicular to a longitudinal direction of the vane, and wherein the at least one profile diverges toward a site where the lid is hinged to the body; and, wherein each profile of the at least one profile is cone-shaped, diverging towards the site where the lid is hinged to the body.

2. Wind turbine according to claim 1, wherein the at least one profile has a maximum height relative to the inner surface of the lid that is equal to at least 10% of a length of the lid in the longitudinal direction of the vane.

3. Wind turbine according to claim 1, wherein the at least one profile has a maximum height relative to the inner surface of the lid that is equal to at least 1% of a length of the lid in the longitudinal direction of the vane.

4. Wind turbine according to claim 1, wherein the vane is an aerofoil shaped body, the lid being hinged to the body at a position adjacent a downstream end of said body.

5. Wind turbine according to claim 1, wherein the vane comprises multiple receptacles.

6. Wind turbine according to claim 1, wherein the vane comprises a first receptacle at a top site side of the vane and a second receptacle at a bottom side of the vane.

7. Wind turbine according to claim 1, wherein the vane comprises multiple separate receptacles positioned along a length of the vane.

8. Wind turbine according to claim 7, wherein each of the multiple separate receptacles comprises said at least one profile.

9. Wind turbine according to claim 1, wherein the turbine is provided with an arrangement operable to force the receptacle to adopt the closed configuration when the vane travels against the direction of the wind.

10. Wind turbine according to claim 1, wherein the turbine is provided with an arrangement operable to force the receptacle to adopt the closed configuration when the vane travels in the direction of the wind.

11. A method of using a wind turbine according to claim 1, for converting wind into work, comprising the steps of:
    rotatably connecting the vane to said support,
    arranging the lid to hinge with respect to the body such that, the receptacle can adopt an open configuration wherein the lid is hinged away from the body, and a closed configuration wherein the lid is hinged towards the body,
    arranging the lid such that the outer surface thereof is directed away from the wind when the receptacle takes the open configuration, and the opposite inner surface.

12. A vane for use with a wind turbine, the vane adapted to be rotatably connected to a support, and the vane comprising:
    an elongated body and
    a wind receptacle formed as a lid adapted to hinge with respect to the body such that the receptacle can adopt an open configuration wherein the lid is hinged away from the body, and a closed configuration wherein the lid is hinged towards the body, the lid having an outer surface which is directed away from the wind when the receptacle takes the open configuration, and an opposite inner surface, wherein the inner surface of the lid is provided with at least one profile protruding from the inner surface, and extending in a direction perpendicular to a longitudinal direction of the vane, and wherein the at least one profile diverges toward a site where the lid is hinged to the body; and, wherein each profile of the at least one profile is cone-shaped, diverging towards the site where the lid is hinged to the body.

* * * * *